United States Patent [19]
Lankford

[11] 3,718,485
[45] Feb. 27, 1973

[54] FOOD DEHYDRATION METHOD

[75] Inventor: Marion P. Lankford, Fremont, Calif.

[73] Assignee: Vacu-dry

[22] Filed: July 1, 1970

[21] Appl. No.: 51,535

[52] U.S. Cl. ..........................99/204, 34/15, 34/92, 34/109, 34/184, 99/1, 99/100 R, 99/100 P, 99/199, 99/246, 99/403, 99/410, 99/411, 99/412, 99/413, 99/414, 99/415
[51] Int. Cl. ..........................A23b 7/02, A23b 7/03
[58] Field of Search ...99/199, 204, 1, DIG. 5, 100 R, 99/100 P, 246, 403, 410, 411, 412, 413, 414, 415; 34/15, 92, 109, 184

[56] References Cited

UNITED STATES PATENTS

| | | | |
|---|---|---|---|
| 2,473,184 | 6/1949 | Webb | 99/204 |
| 3,194,670 | 7/1965 | Dorsey et al. | 99/199 |
| 3,239,946 | 3/1966 | Forkner | 99/199 X |
| 3,261,694 | 7/1966 | Forkner | 99/199 |
| 3,434,410 | 3/1969 | Galle | 99/199 X |
| 3,554,038 | 11/1971 | Sweeney et al. | 34/92 X |
| 150,127 | 4/1874 | Bidwell | 34/184 |

*Primary Examiner*—S. Leon Bashore
*Assistant Examiner*—Frederick Frei
*Attorney*—Eckhoff and Hoppe

[57] ABSTRACT

A method for uniformly controlling the amount of medium and moisture residuals in processes for dehydrating particulate comestibles by contact with a heated liquid heat transfer medium within an evacuated drying region wherein each piece of comestible alternately is moved into contact with circulating medium to heat and vaporize its contained-moisture and then removed from such contact substantially into an adjacent vapor space to release a major portion of the vaporized moisture directly into that space and food products having unique structure and composition which are produced by such method.

4 Claims, 8 Drawing Figures

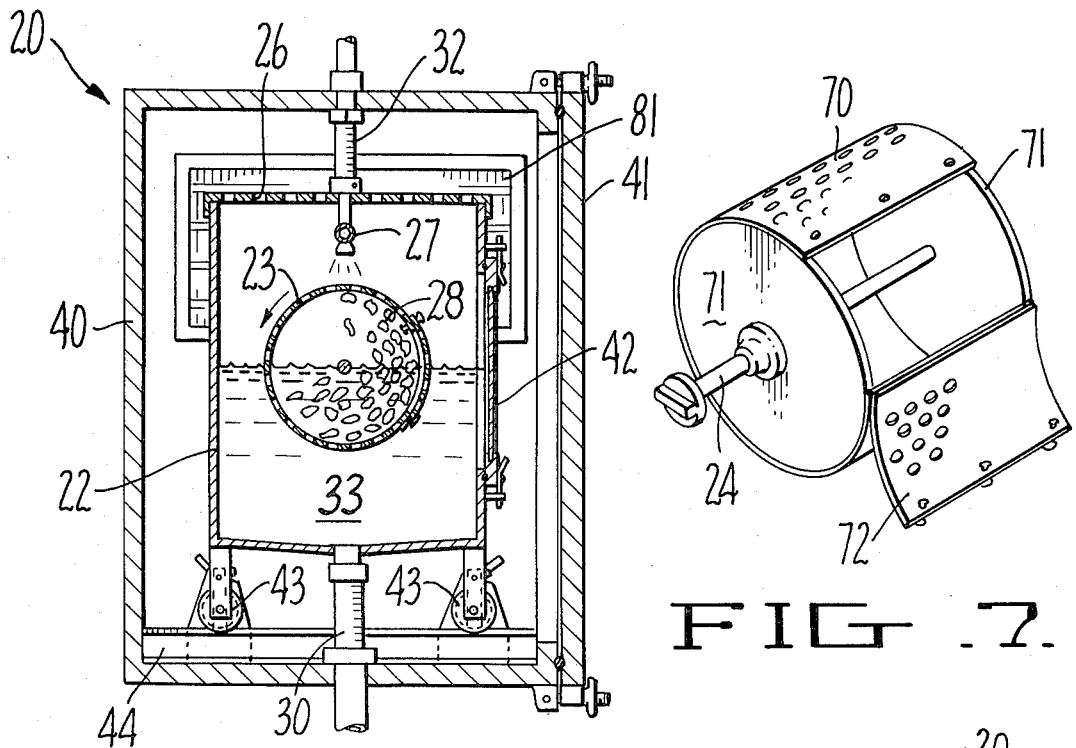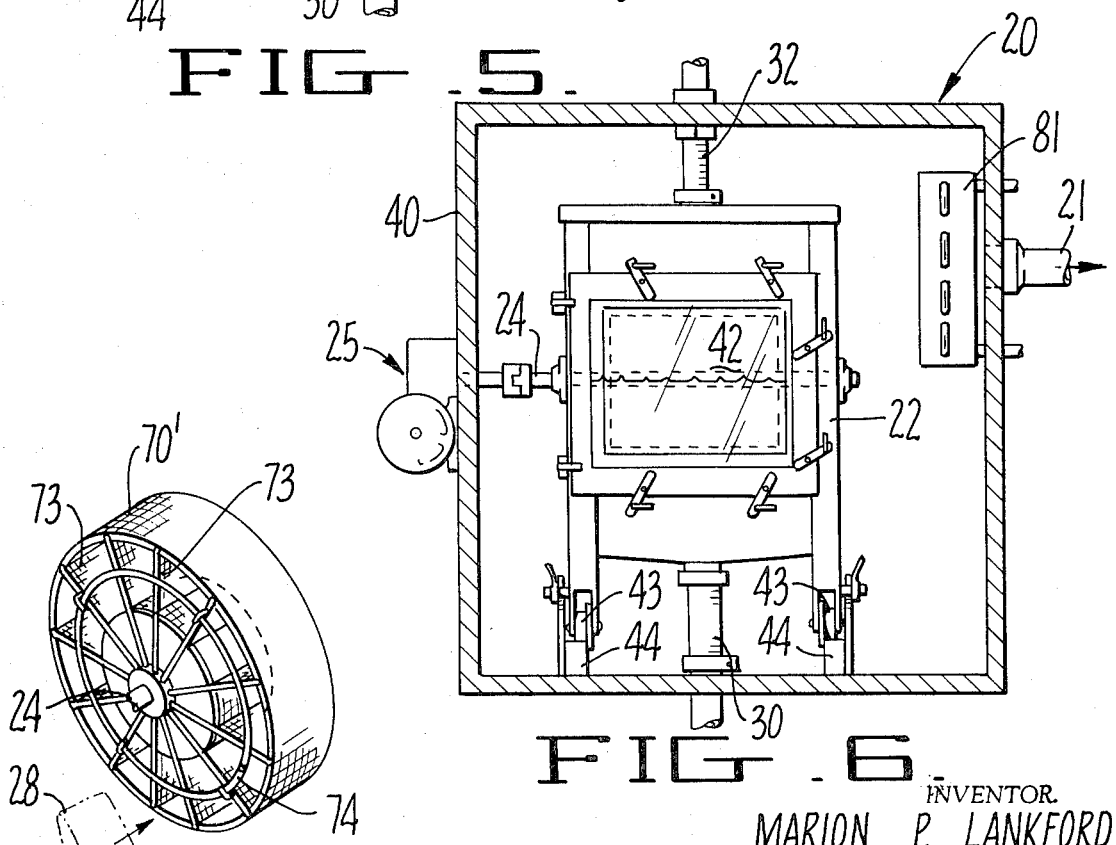

FOOD DEHYDRATION METHOD

Several generalized processes for drying comestibles by contacting them with a heated edible liquid heat transfer medium in a subatmospheric environment have been disclosed in the patent art including U.S. Pat. No. 3,194,670 issued July 13, 1965 to William R. Dorsey, et al., U.S. Pat. No 3,261,694 issued July 19, 1966 to J. H. Forkner, U.S. Pat. No. 3,239,946 issued Mar. 15, 1966 to J. H. Forkner, and U.S. Pat. No. 2,473,184 issued June 14, 1949 to Wells A. Webb. The improvements described herein make practical those generalized disclosures.

One object of this invention is to control the residual medium content in the final dried product at low levels by manipulation of the comestible during processing to reduce moisture replacement by the medium.

Another object of the invention is to move the comestible during processing so as to insure uniform dehydration and exposure to the contacting liquid heat transfer medium while at the same time facilitating the release of vaporized contained-moisture.

Still another object of this invention is to provide dried comestible products having structures and compositions which are unique and heretofore unattainable by known processing procedures.

An object of the invention also is to provide method and means for minimizing the quantity of heat transfer medium used in processing and consumed as a residual in the final dried product.

Other objects and advantages of this invention will become apparent from a consideration of the following description and the accompanying drawings wherein FIG. 1 is a schematic diagram, partly in perspective, of one system for practicing the drying cycle of this invention;

FIG. 5 is an elevational view taken in section on the centerline of the vacuum chamber of FIG. 1;

FIG. 6 is a front elevational view, partly in section, of the vacuum chamber;

FIG. 7 is a perspective view of one form of rotatable basket useful in practicing the method; and FIG. 8 illustrates a compartmentalized basket useful in practicing the invention.

The process, in general, includes development of an evacuated drying region maintained at high vacuum levels in the order of about 0.20 to 10 millimeters of mercury absolute pressure. A supply of an edible hydrophobic heat transfer medium which remains liquid at the selected operating temperatures and pressures is presented to a portion of or a zone within the evacuated drying region. The zone of medium can be either a bath as is disclosed in the Forkner and Webb patents or a shower such as that described by Dorsey, et al. The remainder of the drying region is a vapor space in which essentially no liquid heat transfer medium is present. The particular comestible to be processed is supplied either continuously or in batches to the drying region. During dehydration each particle is alternately moved into contact with the heated liquid transfer medium to heat and vaporize its contained-moisture and then removed from the medium substantially into the vapor space so that a major portion of its vaporized contained-moisture is released directly into the vapor space.

At such time as the desired moisture level is reached the liquid heat transfer medium is withdrawn from the evacuated region and the comestible centrifuged at gravities in the order of nine times the force of gravity to remove essentially all medium from the food particle surfaces. The particles are then cooled, the vacuum released and the dried comestible discharged from the drying region. The entire process can be performed continuously or on the batch basis which is specifically described herein.

Figure 2:
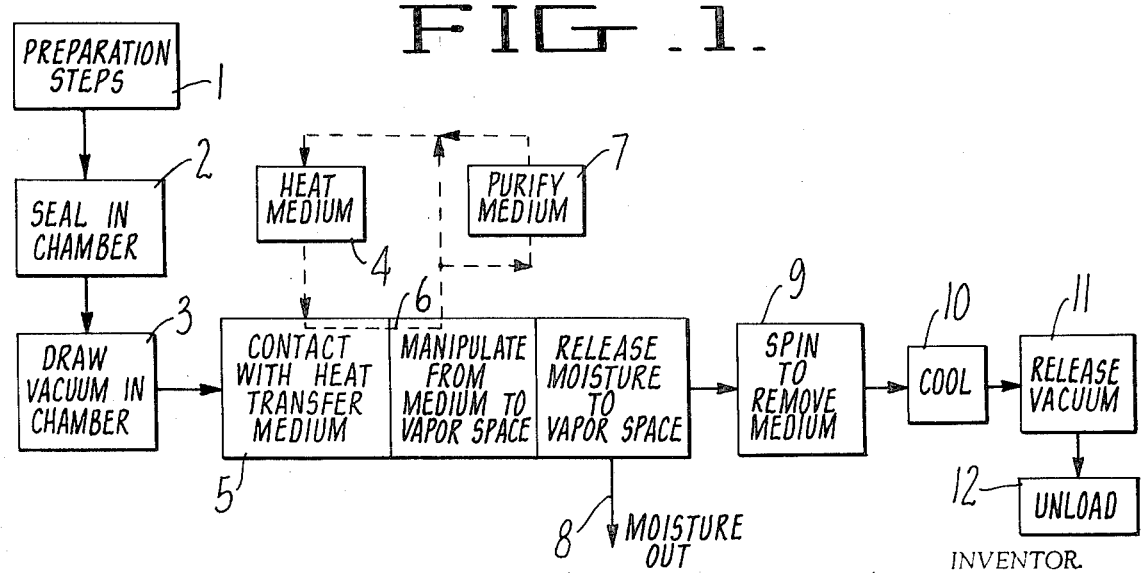
FIG. 2 is a block flow diagram showing the sequence of the method steps.
Figure 3:
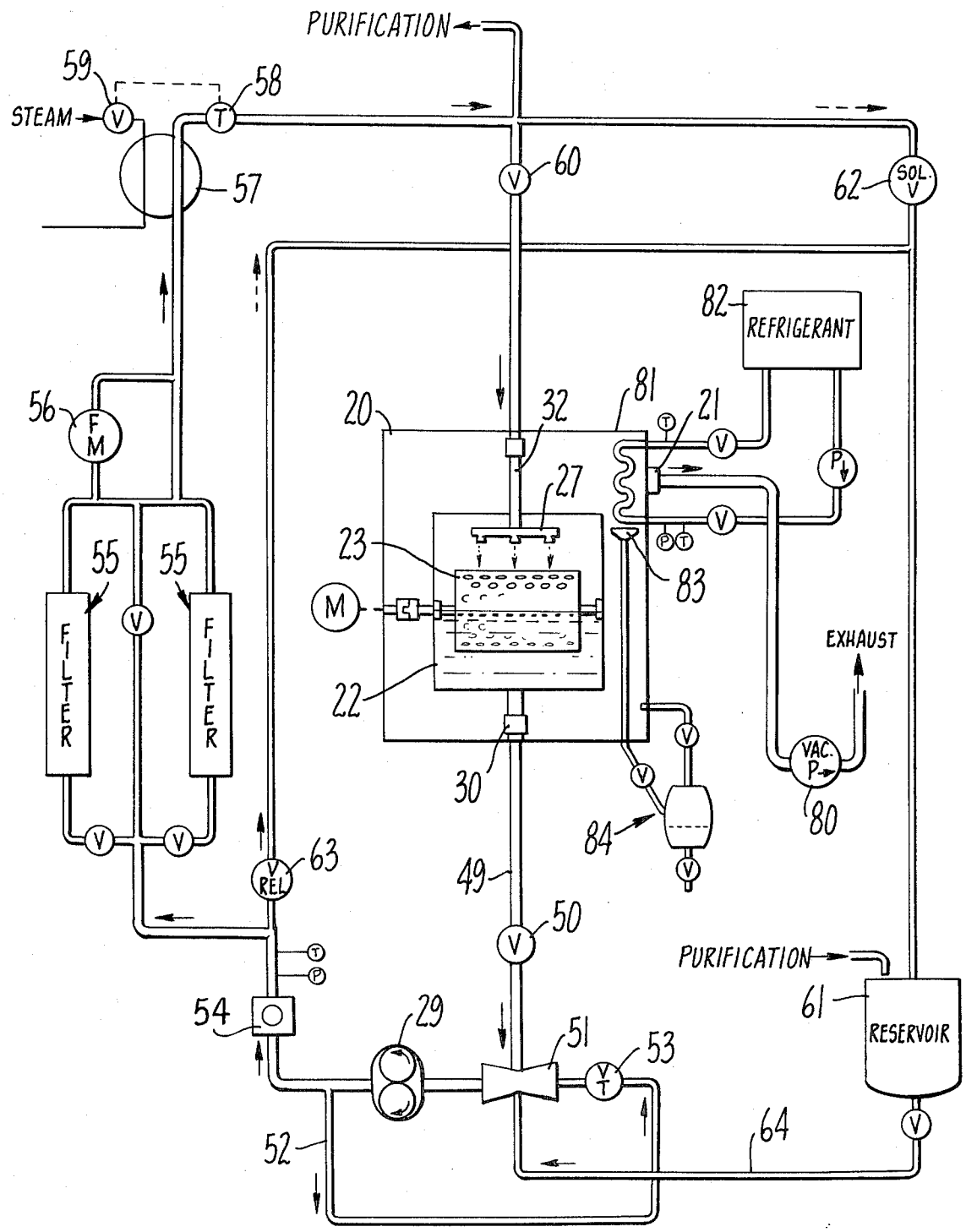
FIG. 3 is a schematic diagram of the system of FIG. 1 showing it more completely and in more detail.

The comestible may be subjected to a number of preparation steps before drying and of variants of the described procedures which depend upon the particular feed stock and the ultimate product qualities desired. With reference to FIG. 2 for example, the preparation steps 1 may comprise cooking, roasting, marination, freezing or other preprocessing steps. Typical ones are described in connection with the examples which follow. The particulate comestible is then 2 sealed in a vacuum chamber, and 3 vacuum is drawn on the chamber. Liquid heat transfer medium is heated 4 and supplied to the chamber to contact the comestible under the manipulative conditions described above. The medium preferably is recycled 6 and continuously or intermittently purified 7 to remove contaminants resulting from contact with the comestible or otherwise. Moisture from the chamber is removed 8 either as condensate through a trap or as vapor through the vacuum system or both. At a selected moisture level medium is withdrawn from the chamber and the comestible spun or centrifuged 9 to remove any remaining medium from the food surfaces while still under vacuum. The comestible is then cooled 10, the vacuum released 11, and the dry product unloaded 12 from the vacuum chamber.

Figure 1:
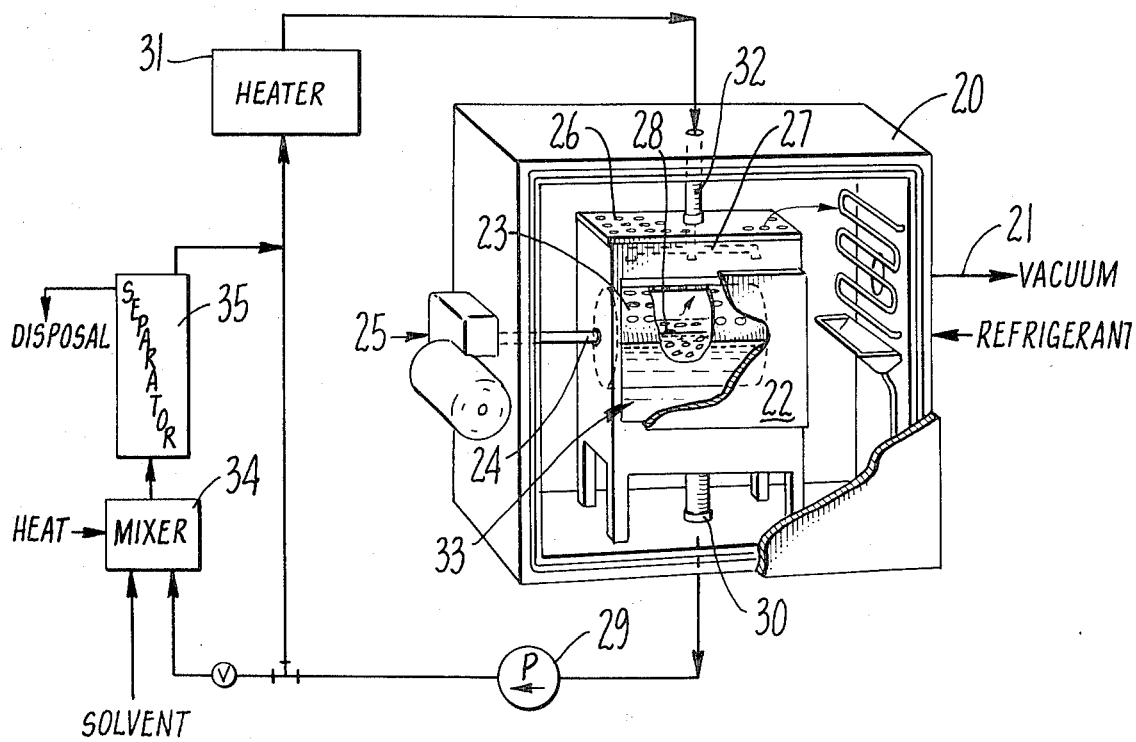

The liquid heat transfer medium has been handled in the system and apparatus described schematically in FIG. 1 which is useful for practicing the invention on a batch basis. It includes a vacuum chamber 20 and means, not illustrated, for drawing vacuum within the chamber at 21. The vacuum means can be a positive displacement pump, oil diffusion pump or steam jet ejectors all of which are commercially available to develop the vacuum levels contemplated herein. Within vacuum chamber 20 is basin 22 which confines the liquid heat transfer medium so that, if desired, it may be applied to the comestible as a bath. Within basin 22 is a generally cylindrical foraminous basket 23 rotated or rocked upon drive shaft 24 by a variable speed motor drive assembly 25 mounted exterior to and on the vacuum chamber wall. The basket confines the food particles but is perforated substantially over its entire surface so that water vapor can freely move out of it and liquid heat transfer medium can move in. The interior of basin 22 through a plurality of perforations 26 communicates with the atmosphere of vacuum chamber 20 so that water vapor can freely pass from the basin to the vacuum system and the interior of basket is under vacuum. Liquid heat transfer medium through distributor 27 during the drying phase of the described embodiment supplies a continuous flow of medium that falls by gravity over the particulate comestible 28 contained within the basket 23.

The heat transfer medium is withdrawn by pump 29 throughout outlet conduit 30 that drains the basin 22. The pump 29 circulates medium through heater 31 and back into the vacuum chamber 20 via inlet conduit 32 to the distributor 27. Heater 31 adds sufficient heat to the medium to make up the heat lost through moisture vaporization in basin 22. Depending upon the particular food being processed, a level of medium can be maintained in the basin 22 to develop a zone of medium which is a bath 33. Its contact with the food under process is accomplished by immersion of the latter in the bath. Alternatively, no liquid level is carried in basin 22 for many applications and in such cases contact of medium with the food being processed is entirely by shower from distributor 27. In either alternative the movement of comestible particles also prevents their clumping as frequently occurs in prior art methods.

Figure 4:
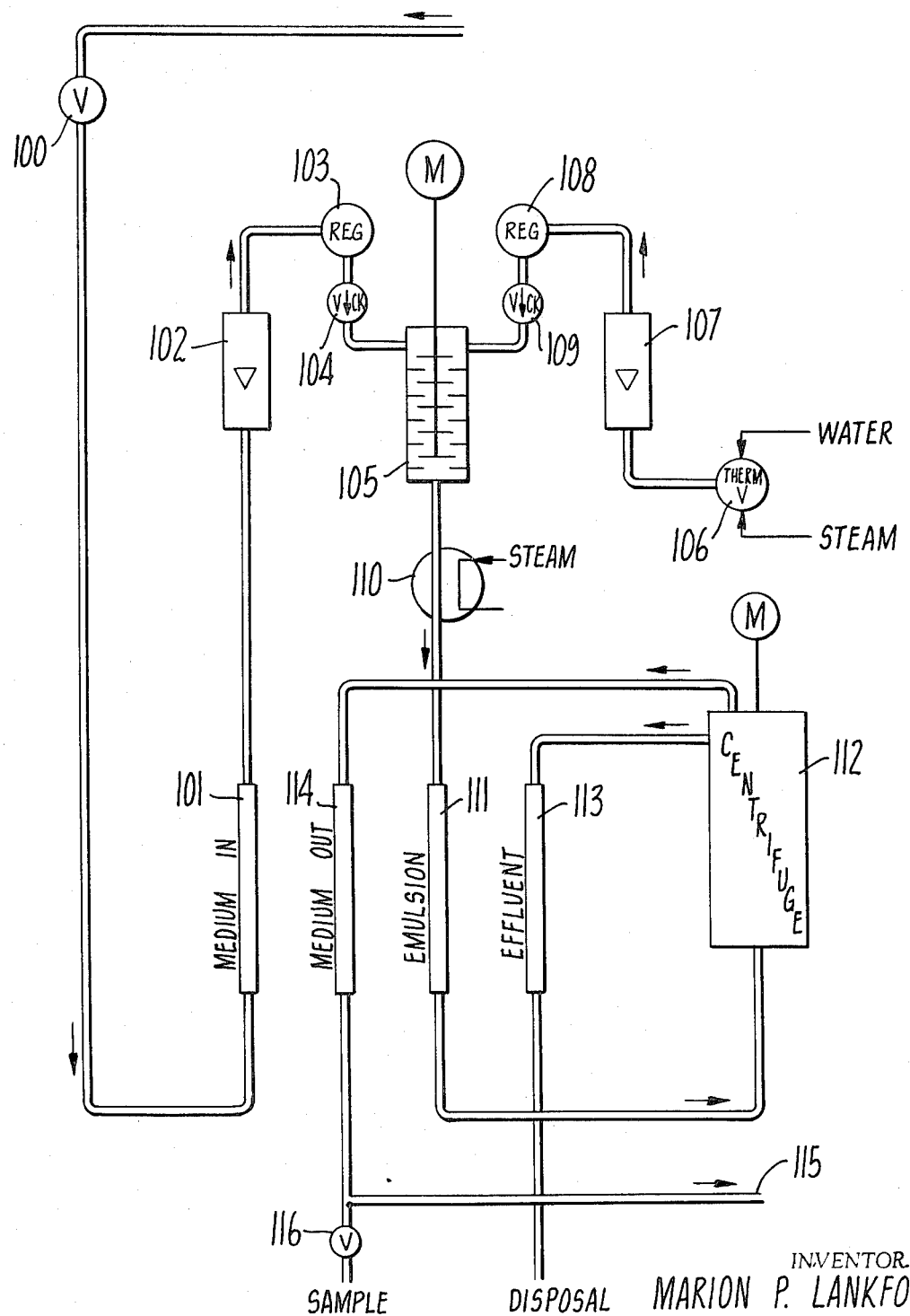
FIG. 4 is a schematic diagram of one system useful for purifying the liquid heat transfer medium used in the method.

The medium circulation system of FIG. 1 also includes purifying the medium as is shown more particularly in FIG. 4. Purification includes continuously or intermittently mixing all or a portion of the circulating medium at mixer 34 with an emulsifiable flushing liquid or solvent for the impurities in the medium; heating the mixed phases to assist extraction from the medium by the flushing liquid; and then separating, as at 35, the cleansed medium from the flushing liquid or solvent which now carries the impurities of the untreated medium and delivers them to further separation means or to the waste disposal drain as illustrated.

During exposure of the processed food to the liquid heat transfer medium, the foraminous basket 23 rotates at a low speed in the order of 10 – 50 rpm. In those instances where a liquid level is maintained in basin 22 this rotation of the basket periodically immerses the food particles under process in the bath and subsequently carries each particle substantially out of the bath into the vapor space lying above it. There most of the contained-moisture vaporized by the heated medium is released directly into the vapor space through, at most, a thin residual film of medium carried on the food particle surfaces. Since each particle periodically moves substantially out of the bath or at least to its surface, it never is exposed for any length of time to a head of liquid medium overlying it with the consequent undesirable hydrostatic pressure that otherwise partially nullifies the effect of the vacuum in the chamber, inhibits moisture release from the particles and/or drives medium into the voids remaining in the food particles after such moisture release.

In instances where heat transfer is entirely through a shower of medium, rotation of the basket again at low speeds in the order of 10 – 50 rpm tumbles the food being processed in the basket and uniformly exposes each particle to the descending shower. This eliminates the umbrella effect of the top layers of comestible in a static system which tend to shield lower layers from the medium shower and results in nonuniform exposure to the medium.

FIGS. 3 – 8 illustrate in more detail one system and the equipment useful for practicing the method on a batch basis. The vacuum chamber 20 as shown on FIGS. 5 and 6 is a rigid steel cabinet 40 provided with a gasketed and windowed access door 41. The chamber carries within it basin 22 which is another steel cabinet with its top pierced by multiple perforations 26 so that the evacuated atmosphere within vacuum chamber 20 also persists within basin 22 and basket 23 and removed water vapor can pass to the vacuum system with minimum entrainment of medium. The basin 22 also has a gasketed access door 42 with a window so that operations within can be viewed from outside the vacuum chamber. In the described embodiment the basin 22 has two pairs of wheels 43 supported upon tracks 44 so that the basin can be rolled in and out of the vacuum chamber. Outlet conduit 30 from the bottom of basin 22 is a flexible coupling that communicates the basin through the vacuum chamber wall to the medium circulating system.

The described medium circulating system includes positive displacement pump 29 which draws medium from the basin 22 through the outlet conduit 30. The outlet line 49 is provided with block valve 50 and a venturi type ejector 51, having its throat connected to the outlet line, assists the pump draw medium from the basin. The ejector 51 is driven by high pressure medium in recirculating line 52 from the discharge of pump 29 and is controlled by throttle valve 53. The circulating pump 29 moves medium through flow indicator 54 and a pair of filters 55, then through flow meter 56 and the tube side of heat exchanger 57. In the embodiment described steam on the shell side of the exchanger 57 heats the medium to its operating temperature. That temperature is controlled by temperature controller 58 which regulates steam flow by actuating valve 59. From heat exchanger 57 the heated medium flows directly to the vacuum chamber 20 through inlet conduit 32 and distributor 27 during the drying portion of the cycle. Alternatively, all or a portion of the medium can be diverted by valve 60 to the purification system shown on FIG. 4 or to storage reservoir 61 through solenoid valve 62. Relief valve 63 on the pump discharge provides pressure relief to the same reservoir 61 and medium make-up is achieved through make-up line 64.

Inlet conduit 32 also flexibly interconnects the medium return line at the vacuum chamber top with the distributor 27 mounted within basin 22. This distributor can be simply a pipe with plural perforations along its length or it can be fitted with nozzles, in both ways, for uniform distribution of medium over foraminous basket 23.

The described basket is cylindrical in shape with a foraminous shell 70 secured between a pair of hubs 71 on drive shaft 24. A foraminous door 72 in the shell provides means for loading and unloading the basket with food to be processed. The basket perforations are small enough to preclude passage of the food particles through them under moderate and high speeds of rotation.

FIG. 8 illustrates another form of basket which is compartmentalized to segregate the processed food. It comprises a shell 70' fabricated from large mesh screening material and has a plurality of radially disposed dividers 73 of the same material which divide its interior into segments. The far side of the basket is also screening material and retainer 74 is located on the near side of the basket and holds large piece foods 28, such as pork loins, in the basket. This design is useful in processing foods which initially are frozen, such as meat and fish, that otherwise tend to refreeze together and agglomerate if not initially separated one piece from the other.

Also in the embodiment described, vacuum is drawn on the vacuum chamber 20 by a positive displacement pump 80 at vacuum connection 21. Water vapor is first removed as much as possible by condensation from the air and vapor being drawn to vacuum pump 80 by cooling coil 81 supplied with refrigerant as at 82. The condensed moisture is caught in catch basin 83 and conducted out of the vacuum chamber through trap means referred to generally as 84.

The improved processing steps are applicable to substantially all particulate foods and especially to a variety of cellular comestibles including meat, poultry, fish, nuts, vegetables and fruits. The following examples are typical;

EXAMPLE 1

A unique puffed apple confection is produced by the process from fresh apple wedges. Fresh apple, approximately one-half inch, wedges are first treated as is customary by a 60 second dip in a 1 percent sodium bisulfite solution to prevent browning. Fresh apple moisture content is about 85 percent by weight on a dry basis and the fresh wedges contain about 14 percent sugar.

The apples are prepared for processing into the unique structure by first marinating them by immersion for 1 hour in a 50 percent aqueous sugar solution at atmospheric pressure. The sugar solution in an open kettle is held at temperatures within the range of 100° to 190° F., preferably about 180° F. The solution is 50 percent water and 50 percent sugar comprising about two-thirds corn syrup solids and one-third sucrose. Seasonings such as malic acid, citric acid, cinnamon and flavorings as well as sodium bisulfite preferably are added in small amounts.

The marinated wedges are then drained and closed into the foraminous basket 23 of the type illustrated in FIG. 7. The doors 42, 41 in basin 22 and vacuum chamber 20, respectively, are then sealed and vacuum drawn on the vacuum chamber to a level of about 10 millimeters of mercury absolute pressure. Heated liquid medium, for example a mixed cotton and soybean oil sold under the tradename Durkex 500, then is circulated through the basin at temperatures in the range of 190° to 200° F. A liquid level in the basin 22 is allowed to build up to about the centerline of the basket. The basket rotates slowly at about 20 rpm. The medium is circulated through the system in a ratio of about 100 to 1 with respect to the apple wedge load in the basket. The wedges are processed under these conditions for about 1 hour at which time their moisture content reduces to about 3 – 8 percent.

Then, the medium is drained from the basin 22 and the basket is rotated rapidly at about 360 rpm under the same vacuum conditions for 1 to 2 minutes. With a basket diameter of 18 inches this results in a centrifugal force at the basket periphery of about nine times the force of gravity. Centrifugation removes undrained medium from the surfaces of the apple wedges as well as medium which may have permeated the apple material but is not tightly bound therein by capillary action.

Following centrifugation the chamber pressure is rapidly drawn down lower to a level of about 1.0 to 0.20 millimeters of mercury absolute. The moisture level consequently drops to 2½ percent or less. Its evolution evaporatively cools the apple wedges over a period of 60 minutes to about 90° F. The wedges can be observed to puff substantially during this evaporative cooling step. The vacuum then is broken by admission of nitrogen gas and the now dried apple wedges are unloaded from the chamber.

The wedges have a final moisture content of about 2½ percent by weight and have a medium residual of about 3 to 10 percent. The wedge structure is unique. It comprises a honey-comb structure comprising a single cavity substantially triangular in cross-section or a plurality of smaller irregular cavities formed in the center of the three wedge walls which are very friable and have an expanded cell structure. The overall wedge appearance is slightly puffed with the sidewalls of the wedge concaved outwardly from their original fresh configuration.

EXAMPLE 2

Lean pork loins at about 60 percent moisture are first quick frozen with nitrogen at least to a temperature level of −20° F. The frozen pork is loaded into a foraminous basket of the type illustrated in FIG. 8 wherein each piece is segregated from the other in a separate compartment. After sealing the basin and vacuum chamber, vacuum is drawn upon the chamber to a level of about 1,500 to 500 microns. Medium such as the mixed vegetable oils of Example 1 circulates through the basin at temperatures ranging from 90° to 150° F., preferably about 130° F. In processing pork it has been found preferable not to maintain a level of heat transfer medium in the basin 22. Heat transfer is done entirely by a shower of heated medium over the pork emerging from distributor 27. The basket rotates slowly at about 20 rpm.

After about 3 ½ hours of processing under these conditions the moisture level is less than 2 percent. The medium is drained from the basin and the basket rotated again for 1 to 2 minutes under the same vacuum conditions at about 360 rpm or a speed sufficient to attain centrifugal forces about nine times that of gravity at the basket periphery. The pork is then allowed to cool, the vacuum broken by admission of liquid nitrogen and the dried pork loins removed from the chamber.

The final product has a quality and structure similar to that of freeze-dried material with a residual moisture content of less than 2 percent and a residual medium content in the range of 37 to 38 percent. Total drying time is substantially less than the time required to reach the same moisture level by freeze-dry techniques.

EXAMPLE 3

Low fat potato chips can be made by the described processes having a residual fat content in the order of half that of commercially available potato chips produced by deep fat frying.

Raw Russett potato slices about 0.050 inches in thickness initially are loaded into the basket of FIG. 7 and precooked in liquid medium for about 1 – 3 minutes under atmospheric pressure at about 225° to 250° F. The precook provides the flavor and browning usually expected in commercial potato chips. During the precook the liquid medium temperature is allowed to drop to the range of 180° to 200° F.

The vacuum chamber is then sealed and a vacuum drawn to about 1 millimeter of mercury absolute pressure. The liquid heat transfer medium again is the mixed vegetable oils of Example 1 circulated at temperatures in the range of 180° to 225° F., preferably at the upper end of that range. The medium level in basin 22 is at about the basket centerline. The potato slices are processed under these conditions for a period of about 30 to 40 minutes with the basket rotated at about 20 rpm.

The medium then is withdrawn from the basin and the potato slices centrifuged for one to two minutes under the same vacuum conditions at about 360 rpm or a speed sufficient to develop centrifugal forces of about nine times the force of gravity at the basket periphery.

The vacuum is broken with nitrogen and the now dried chips unloaded from the chamber. They have a residual moisture content of about 0.5 percent by weight and residual medium in the range of 15 to 18 percent compared with the typical 35 percent fat content for commercially available deep fat-fried potato chips.

EXAMPLE 4

Fresh or frozen green beans such as California Bush varieties are cut to suit need and dipped in about a 1 percent magnesium or sodium bisulfite solution for color preservation. The beans have an approximate 90 percent moisture content.

The beans are placed into a foraminous basket 23 of the type illustrated in FIG. 7 and vacuum on the chamber is drawn down to a level of about 10 millimeters of mercury absolute pressure. At that level heated medium, for example, the mixed cotton and soybean oil described in Example 1, is started through the basin at temperatures in the range of 170° – 190° F. A liquid level in the basin 22 is allowed to build up to about the center line of the basket and the chamber pressure is drawn down to a level in the order of one-half millimeter of mercury absolute pressure. The basket rotates slowly at about 20 rpm. The beans are processed under these conditions for about 45 – 60 minutes at which time their moisture content reduces to about 3 percent.

The medium then is drained from the basin 22 and the basket is rotated rapidly for 1 – 2 minutes under the same vacuum conditions at about 360 rpm or a speed sufficient to develop centrifugal forces at about nine times the force of gravity at the basket periphery.

Next the beans are cooled and the vacuum broken with nitrogen. They have a residual moisture content of 2 ½ to 6 percent on a dry weight basis and residual medium in the range of 8 to 16 percent. The beans retain their original size, shape and color without shriveling of the soft tissue surrounding the seed cell.

The circulating liquid heat transfer medium progressively picks up soluble contaminants from the comestibles being processed. These contaminants either must be removed from the medium or a continuous makeup of fresh medium used to hold them to tolerable levels.

For instance, in processing the apple wedges of Example 1 the medium becomes contaminated by the water soluble marination sugar and soluble solids in the apples themselves as it continuously washes through them. These contaminants eventually cause off-color and off-taste product if not removed.

It has been found that a purification system as described in FIG. 4 is useful to remove these contaminants by mixing the heat transfer medium with an emulsifiable flushing fluid or solvent for the contaminants which extracts the contaminants from it and after separation from the medium carries the impurities off in solution for disposal or reclamation procedures. For the apple wedges of Example 1, for instance, medium either continuously or intermittently is directed through the purification system by opening control valve 100. Contaminated medium flows through sight glass 101 where its turbidity, etc. can be observed, indicating flow meter 102, flow regulator 103, and check valve 104 to a variable speed motor driven mixer 105 which emulsifies the medium and solvent. A suitable unit is a multiple propeller type mixer with intermediate baffles such as is shown schematically in FIG. 4.

Since the impurities for the apple example described above principally are water soluble sugars, hot water or a mixture of water and steam at about 150° F. through temperature control valve 106, another indicating flow meter 107, flow regulator 108 and check valve 109 is also supplied to the mixer 105. The hot water and transfer medium are thoroughly mixed in ratios ranging from 25 percent water – 75 percent medium to 75 percent water – 25 percent medium. The outflow from the mixer 105 is an oil - water emulsion. It is steam heated in exchanger 110 to about 180° F. to enhance solution of contaminants in the solvent and then passed through another sight glass 111, by which its emulsification can be observed, to centrifuge 112. Centrifugation there breaks the emulsion and separates the oil and water phases. The water phase and the soluble contaminants dissolved in it flow through effluent sight glass 113 to waste disposal or to reclamation processing. The medium or oil phase passes through a clarified medium sight glass 114 and then returns to the medium circulating system as at 115. Samples of clarified medium may be taken at sample connection 116 to determine its suitability for recycle.

The foregoing systems and equipment have been described for clarity of understanding only and no unnecessary limitations should be understood from them for modification will be apparent to those skilled in this art. The invention is defined by the appended claims.

I claim:

1. In a process for removing moisture from a comestible by contacting it with a heated edible liquid heat transfer medium within an evacuated drying region, the improvement comprising the steps of
  maintaining a zone of medium in said drying region;
  simultaneously defining a vapor space within said drying region separate from said zone of medium;
  continuously and alternately, first moving the comestible into contact with the medium in said zone to vaporize its contained-moisture; and
  then removing said comestible from said zone substantially into said vapor space to release a major portion of the vaporized contained-moisture directly into said vapor space.

2. The process of claim 1, including the additional steps of centrifuging the liquid heat transfer medium from the surfaces of said comestible within said drying zone at a predetermined moisture content;
cooling said comestible;
increasing the pressure in said drying zone to atmospheric;
and then removing the comestible from said drying zone.

3. In a process for removing moisture from a comestible by contacting it with a heated edible liquid heat transfer medium within an evacuated drying region, the improvement comprising the steps of
maintaining a bath of medium in said drying region;
simultaneously defining a vapor space within said drying region separate from and overlying said bath of medium;
continuously and alternately, first moving the comestible into contact with the medium in said bath to vaporize its contained-moisture; and
then moving said comestible at least to the surface of said bath adjacent to said vapor space to release a major portion of the vaporized contained-moisture substantially into said vapor space.

4. The process of claim 3, including the additional steps of centrifuging the liquid heat transfer medium from the surfaces of said comestible within said drying zone at a predetermined moisture content;
cooling said comestible;
increasing the pressure in said drying zone to atmospheric;
and then removing the comestible from said drying zone.

* * * * *